United States Patent
Hilbert et al.

(10) Patent No.: US 12,467,399 B2
(45) Date of Patent: Nov. 11, 2025

(54) VARIABLE EXHAUST CONTROL SYSTEM

(71) Applicant: Cobra Aero LLC, Cleveland, OH (US)

(72) Inventors: H. Sean Hilbert, Hillsdale, MI (US);
Phil McDowell, Hillsdale, MI (US);
Scott Castonguay, Hillsdale, MI (US)

( * ) Notice: Subject to any disclaimer, the term of this patent is extended or adjusted under 35 U.S.C. 154(b) by 703 days.

(21) Appl. No.: 15/752,366

(22) PCT Filed: May 2, 2016

(86) PCT No.: PCT/US2016/030477
§ 371 (c)(1),
(2) Date: Feb. 13, 2018

(87) PCT Pub. No.: WO2016/179119
PCT Pub. Date: Nov. 10, 2016

(65) Prior Publication Data
US 2019/0186329 A1    Jun. 20, 2019

Related U.S. Application Data

(60) Provisional application No. 62/155,828, filed on May 1, 2015.

(51) Int. Cl.
*F01N 13/08* (2010.01)
*F01N 13/10* (2010.01)
(Continued)

(52) U.S. Cl.
CPC .......... *F01N 13/087* (2013.01); *F01N 13/10* (2013.01); *F02B 61/04* (2013.01); *F02B 75/02* (2013.01);
(Continued)

(58) Field of Classification Search
CPC .......... F01N 3/00; F01N 3/002; F01N 3/0222; F01N 3/0224; F01N 3/0226;
(Continued)

(56) References Cited

U.S. PATENT DOCUMENTS 3,367,311 A * 2/1968 Tenney ................... F01N 13/10
123/65 E
3,751,921 A * 8/1973 Blomberg ............... F01N 1/165
123/323

(Continued)

*Primary Examiner* — Binh Q Tran
(74) *Attorney, Agent, or Firm* — Brian D Johnson

(57) ABSTRACT

An apparatus for adjusting power and noise characteristics of an internal combustion engine comprises a wall configured to define an engine cylinder that includes a bore and a compression relief passage. A compression relief valve is configured to selectively adjust fluid flow capacity of the compression relief passage. A manifold is configured to be in fluid communication with the exhaust passage and includes an exhaust bypass valve to permit exhaust to at least partially bypass a noise suppressor. Operational characteristics of the engine can be adjusted along a range that extends from a first set of operational characteristics present when both the compression relief valve and the exhaust bypass valve are in a fully open position to a second set of operational characteristics present when both the compression relief valve and the exhaust bypass valve are in a fully closed position.

8 Claims, 8 Drawing Sheets

(51) Int. Cl.
  *F02B 61/04* (2006.01)
  *F02B 75/02* (2006.01)
  *F02D 13/02* (2006.01)
  *F02N 19/00* (2010.01)

(52) U.S. Cl.
  CPC ..... *F02D 13/0276* (2013.01); *F02D 13/0284* (2013.01); *F02N 19/004* (2013.01); *F02B 2075/025* (2013.01); *F02D 2013/0292* (2013.01)

(58) Field of Classification Search
  CPC ...... F01N 3/0231; F01N 3/033; F01N 3/0335; F01N 3/035; F01N 3/0337; F01N 3/2882; F01N 3/2885; F01N 1/003; F01N 1/02; F01N 1/023; F01N 1/04; F01N 1/065; F01N 1/084; F01N 1/10; F01N 1/125; F01N 1/20; F01N 1/22; F01N 1/24; F01N 2230/04; F01N 2290/00; F01N 2290/04; F01N 2290/08; F01N 2290/10; F01N 2590/04; F01N 2590/06; F01N 2590/08; F01N 2590/10; F02B 41/08; F02B 57/00; F02B 57/06; F02B 59/00; F02B 2710/00; F02B 2710/13; F02B 2700/00; F02B 2700/03; F02B 2700/031; F02B 2700/032; F02B 2700/037; F02B 2720/13; F02B 2720/312; F02B 2720/133; F02B 2720/136; F02B 2720/15; F02B 2720/23; F02B 2720/233; F02B 2720/236; F02B 2720/238

See application file for complete search history.

(56) References Cited

U.S. PATENT DOCUMENTS

| | | | |
|---|---|---|---|
| 7,104,252 B1* | 9/2006 | Pattullo | F02D 9/16 |
| | | | 123/311 |
| 2006/0037570 A1* | 2/2006 | Hitomi | F02B 29/083 |
| | | | 123/90.15 |
| 2006/0048981 A1* | 3/2006 | Bychkovski | F01L 9/04 |
| | | | 180/65.285 |
| 2010/0242899 A1* | 9/2010 | Hitomi | F02D 41/3035 |
| | | | 123/299 |

* cited by examiner

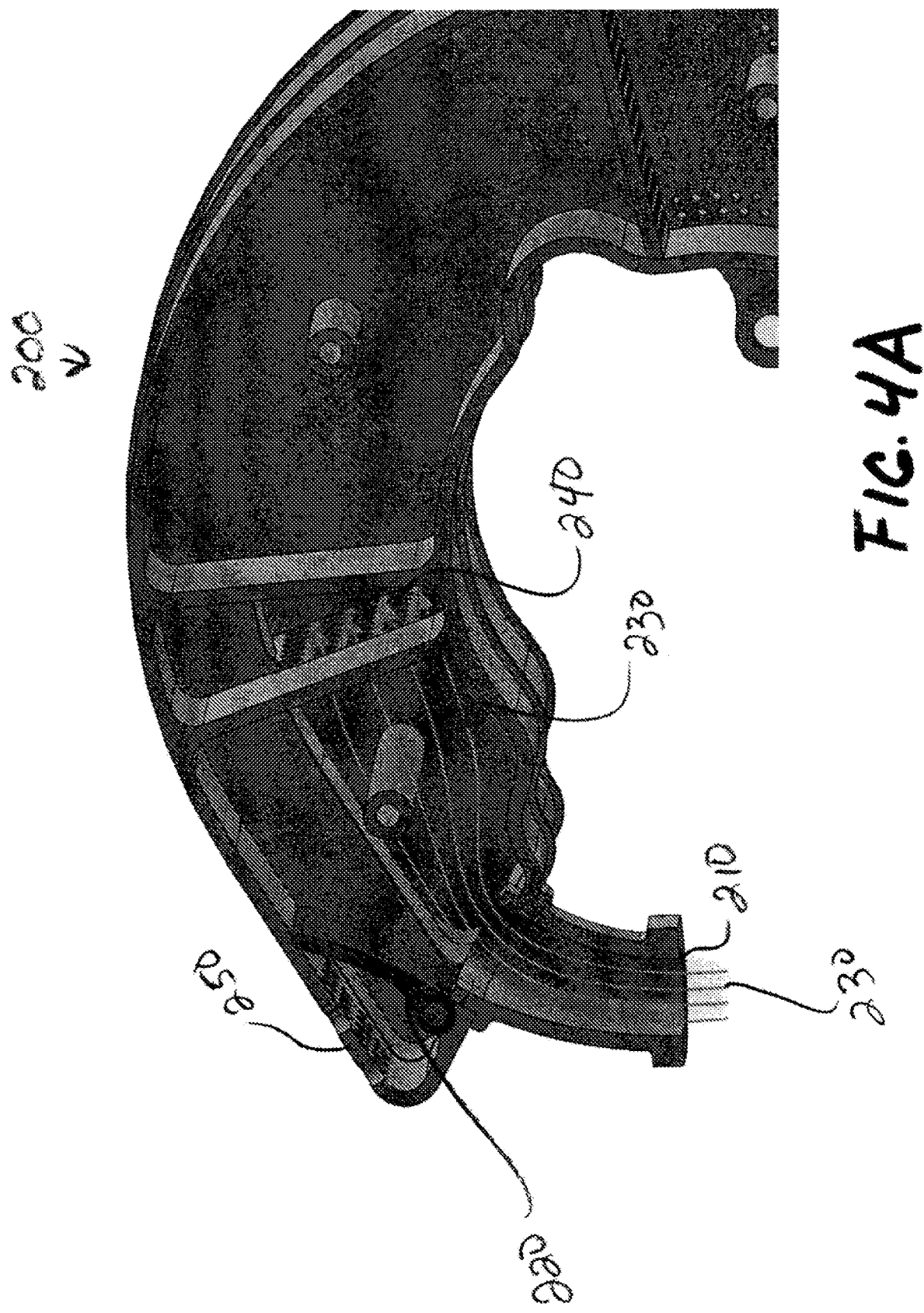

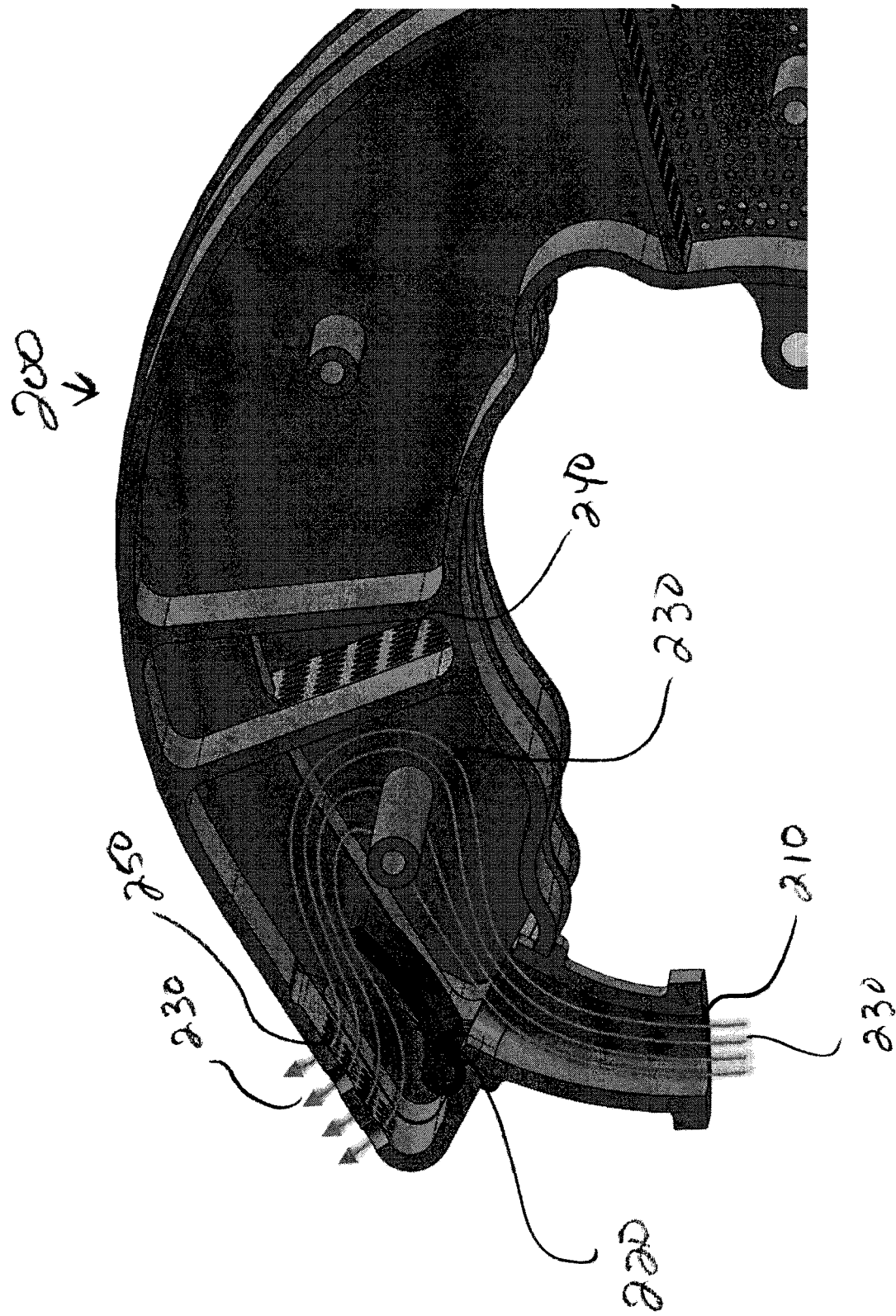

VARIABLE EXHAUST CONTROL SYSTEM

TECHNICAL FIELD

The systems and methods disclosed and described in this document are directed generally toward the field of combustion engines and more specifically at high power/low noise combustion engines for aerial vehicles.

BRIEF DESCRIPTION OF THE DRAWINGS

FIG. 4A is a perspective interior view of an engine exhaust manifold.
FIG. 413 is a perspective view of an engine exhaust manifold.

DETAILED DESCRIPTION

The apparatuses and methods disclosed and described below provide examples of how to make and use these apparatuses and methods. For ease of reading, not every possible combination or components or steps has been described together. Those having an ordinary level of skill in this art area will recognize from reading this disclosure that the components can be arranged in different combinations or that steps can be performed in parallel or in different orders in many circumstances. Additionally or alternatively, components not described below can be added to the apparatuses described and steps not described can be added to the methods without changing the core apparatuses or methods that significantly alters their structure or function. Any failure to disclose a specific combination of component parts already described or a specific ordering of steps in a method should not be taken as an indication that such combination or ordering is not possible or was not contemplated.

Figure 1A:
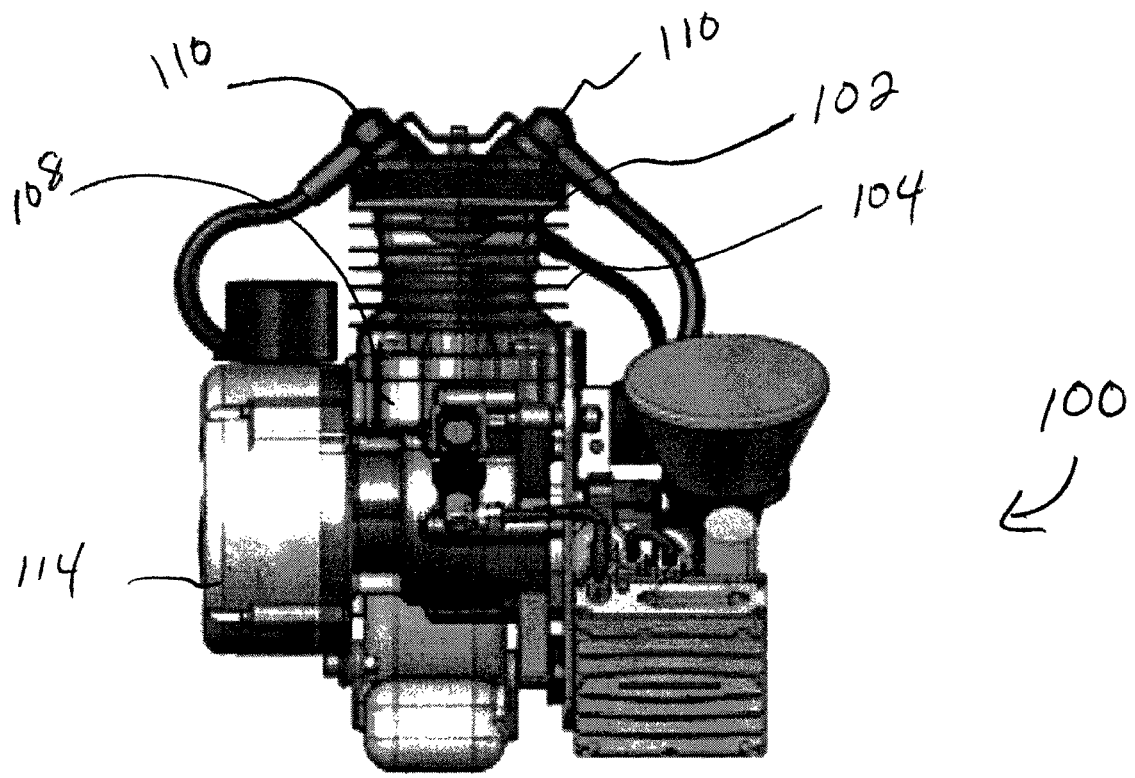
FIG. 1A is a side view of an internal combustion engine.
Figure 1B:
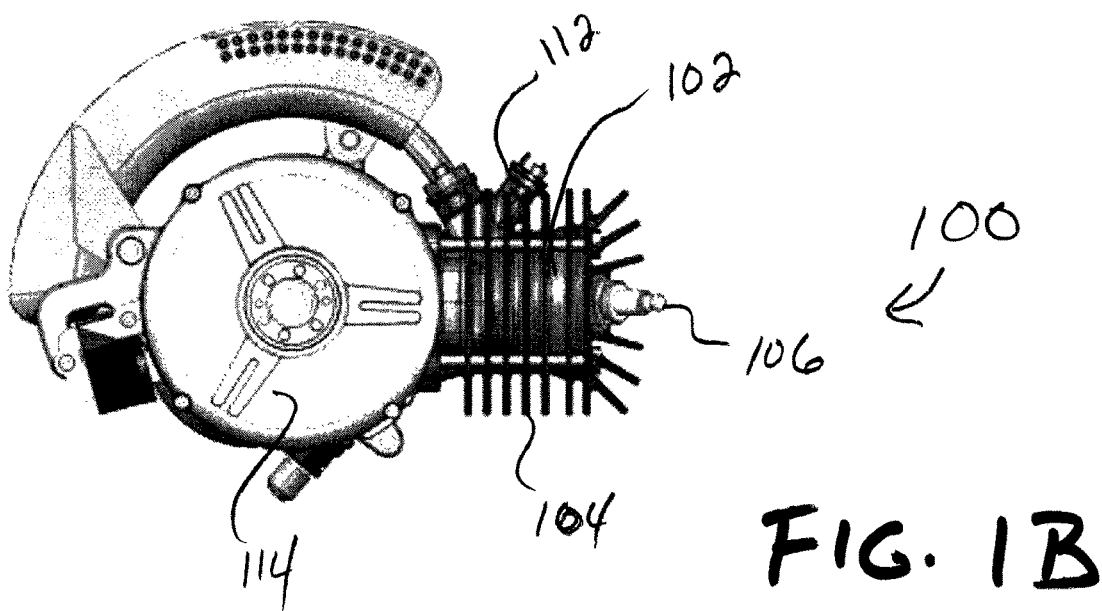
FIG. 1B is a front view of an internal combustion engine.

FIG. 1A is a side view of an internal combustion engine 100. FIG. 1B is a front view of the same internal combustion engine 100. In this example, a two-stroke internal combustion engine is shown. The engine 100 can include a cylinder 102 with cooling fins 104. A spark plug 106 can be used as an ignition source. The cylinder 102 can be mounted on a crankcase 108. Each of the spark plug wires 110 can carry electrical energy to sparkplug 106. A compression relief valve assembly 112 can be affixed within the cylinder 102. Rotational power from the engine 100 can be transferred by driving components 114, such as a transmission assembly. For ease of description, not every part of a complete internal combustion engine is shown and described. Those of ordinary skill in this art area will readily recognize from reading this disclosure that other components either can or must be present, depending upon the component and a particular implementation.

A typical two-stroke internal combustion engine that can use its piston to determine timing at which ports open and close exhibits symmetric port timing. Crank angle degrees for which a port is closed on upstroke are the same crank angle degrees for which the port is open on downstroke. When using a variable exhaust mechanism to change port height, timing of both port closing and opening are affected equally.

Timing of closing and opening events can have various effects on engine operation. On the port closing side, when a piston is rising and closing a port, an exhaust port that is located lower in a cylinder can trap contents of the cylinder earlier. Depending on scavenging characteristics of the cylinder, tuning of inlet and exhaust systems, and both speed and load of engine operation, timing of trapping of cylinder contents can bias charge purity (the ratio of fresh charge to left-over exhaust gasses from a previous power cycle) in either direction. Additionally or alternatively, earlier trapping of cylinder contents can increase a trapped compression ratio and yield higher thermal efficiency.

On the exhaust port opening side, combusting gasses inside the cylinder can exert force on the piston for a larger number of crank degrees, thereby performing more work and increasing thermal efficiency. Additionally, cylinder pressure is less at the time of port opening which can result in lower sound output.

Figure 2B:
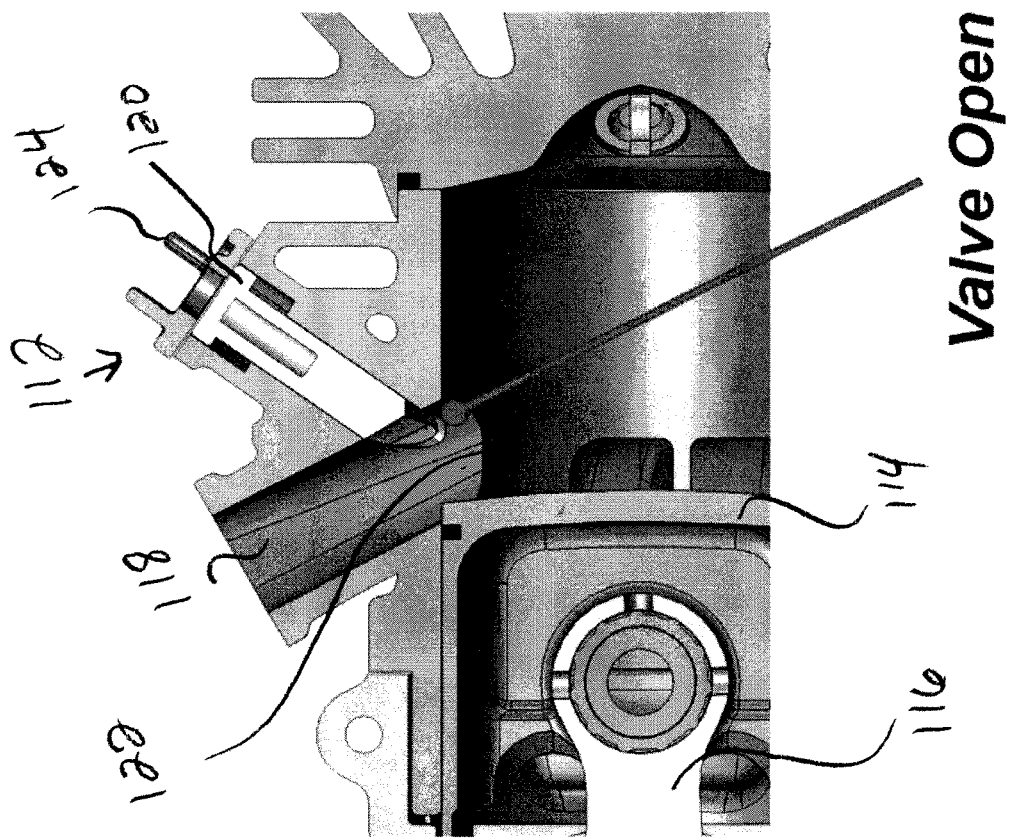
FIG. 2B is a side cutaway view of a combustion chamber of an internal combustion engine.
Figure 2A:
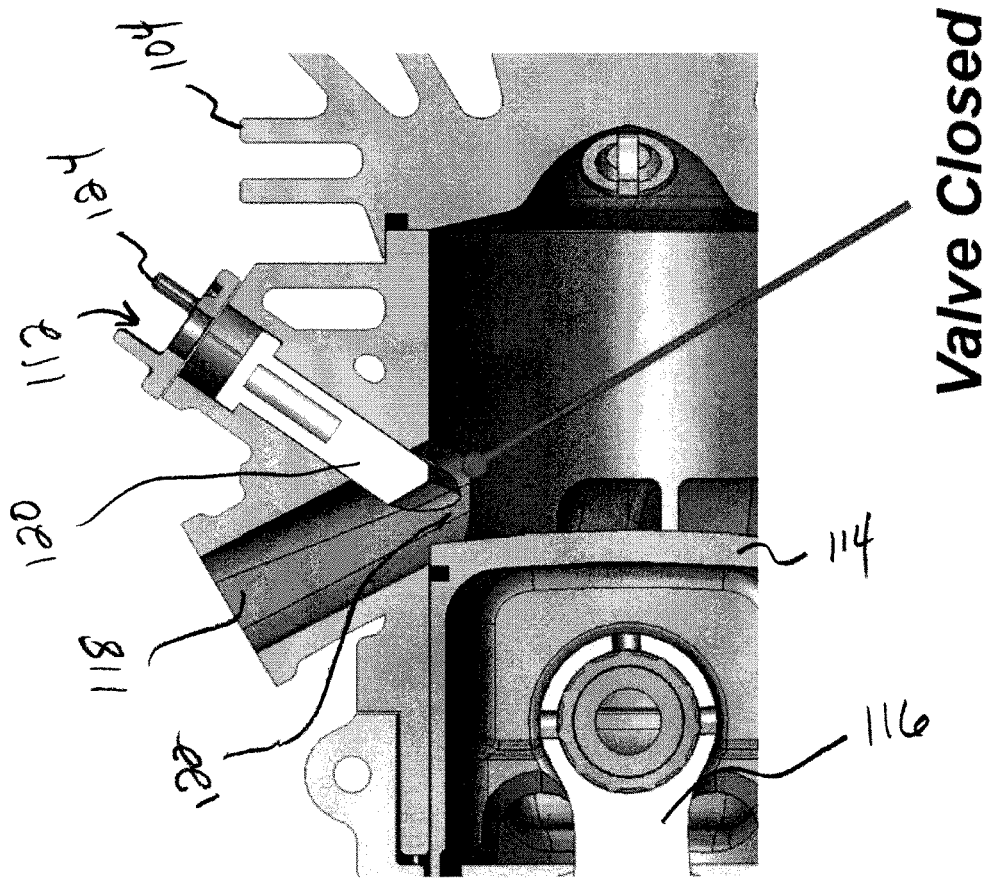
FIG. 2A is a side cutaway view of a combustion chamber of an internal combustion engine.

FIG. 2A is a side cutaway view of a combustion chamber of an internal combustion engine. The combustion chamber can include a piston head 114 and a push rod 116. An exhaust passage 118 is shown with the compression relief valve assembly 112. The exhaust bypass valve assembly is shown in FIG. 2A with valve 120 in a closed position. The piston head 114 is shown at the end of its travel with an exhaust port 122 exposed. In FIG. 2B the compression relief valve 120 is shown in an open position. In both FIGS. 2A and 2B, the compression relief valve 120 can be actuated through the use of a vacuum line (not shown) that can be attached to a vacuum port 124. It should be noted that although the compression relief valve 120 is shown only in a wholly open position in FIGS. 2A and 2B, it can also be fully closed and partially closed to adjust adjust flow capacity through the compression relief passage.

Figure 3:
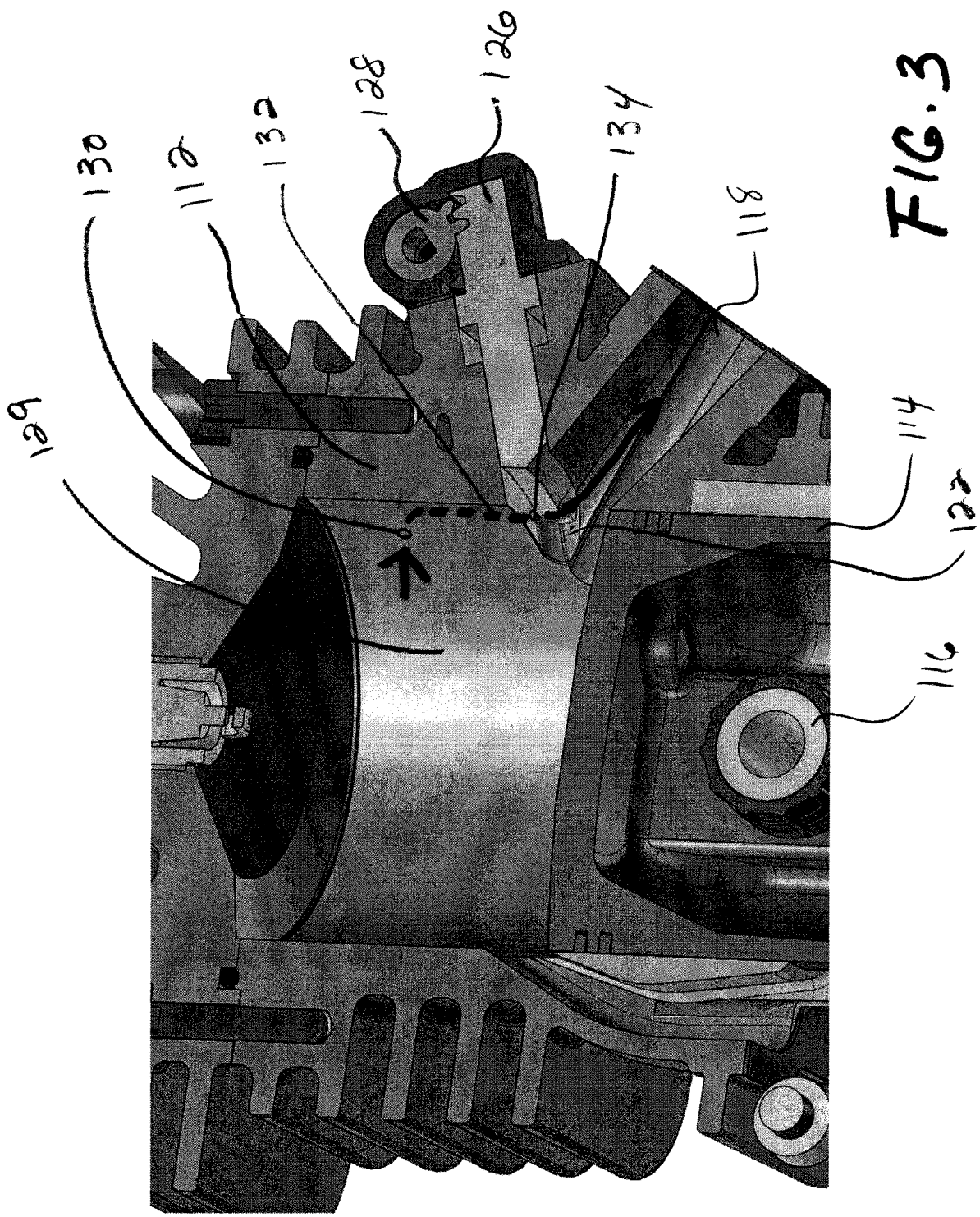
FIG. 3 is a perspective cutaway view of a combustion chamber of an internal combustion engine.

FIG. 3 is a perspective cutaway view of a combustion chamber of an internal combustion engine. In this figure, a compression relief valve 126 can be actuated by an electro-mechanical actuator 128, such as a solenoid switch or other suitable actuator. A compression relief passage can extend from an inlet port 130 located within a combustion chamber 129, through a wall of the cylinder 112, and terminate at an outlet port 134. When the compression relief valve 126 is in an open position as shown here, exhaust fluid can travel through the compression relief passage along path 132 from the combustion chamber 129 into the exhaust passage 118 when the exhaust port 122 is closed by travel of the piston head 114. Closing the compression relief valve 126 can restrict or wholly prevent the flow of exhaust fluid from the combustion chamber 129 into the exhaust passage 118 by at least partially blocking the outlet port 134. It should be noted that although the compression relief valve 126 is shown only in a wholly open position in FIG. 3, it can also be fully closed and partially closed to adjust the size of the outlet port 134 and thereby adjust flow capacity through the compression relief passage.

Application of an exhaust port bypass valve can reduce noise at its source by waiting until cylinder pressure is relatively low before opening the exhaust port. This technique can reduce the pressure gradient at the time of exhaust port opening, reducing sound pressure levels and perceived noise. Energy that could have been consumer creating noise can be captured to increase efficiency of the engine.

Figure 6:
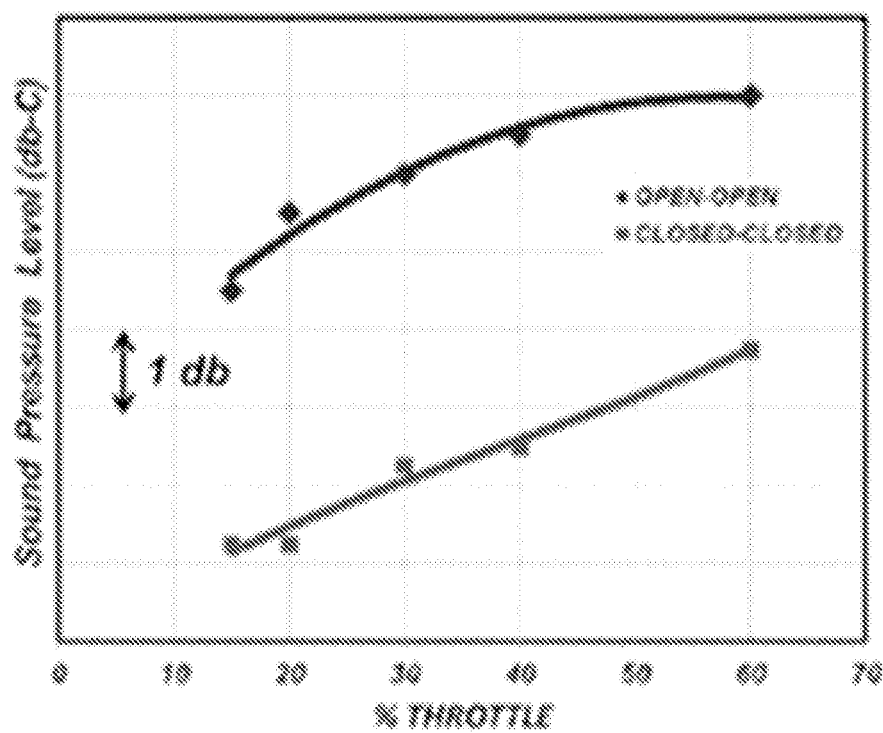
FIG. 6 is a table charting sound pressure level and throttle position.

FIG. 6 provides a chart 100 showing sound pressure level charted against throttle position. Throttle position and engine speed at each point were held (as further described below) so that the engine was operating along a 16-14 propeller characteristic. Results are shown though 60% throttle. Above that level, the engine would be operating with both valves open and no noise benefit would be available.

Across the propeller curve, a consistent reduction of approximately 3.5 to 4 decibels (3.55-4 db) can be realized. If all else is constant, the overall system can be made quieter or the exhaust system can be made less restrictive to increase power.

FIG. 4A is a perspective interior view of an engine exhaust manifold 200. The manifold 200 can include an exhaust inlet 210. A bypass valve 220 can control flow of exhaust fluid (depicted by flow lines 230). In FIG. 4A, the bypass valve 220 is shown in a closed position. In the closed position, flow of the exhaust fluid can be directed toward a noise suppressor 240. In FIG. 4B, the bypass valve 220 can permit flow of the exhaust fluid to a vent 250. The vent 250 can lead directly to outside atmosphere or to an exhaust system that bypasses the noise suppressor 240. Those of ordinary skill in this art area will readily recognize from reading this disclosure that the noise suppressor 240 can have a different configuration or construction. Additionally, although the bypass valve 220 is shown only in fully open and fully closed positions, partially open and partially closed positions are possible. The bypass valve 220 can be operated by an electromechanical actuator, a solenoid, a vacuum system, or other suitable system.

Figure 7:
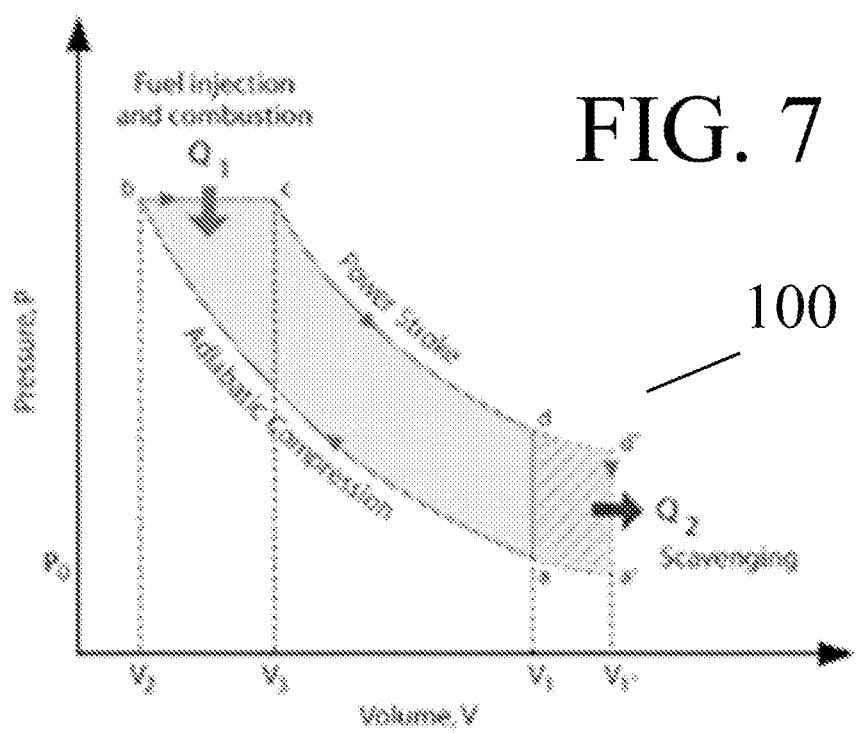
FIG. 7 is a diagram of a combustion cycle.

With reference to FIG. 7, a simplified method to visualize and estimate effects of variable exhaust port timing is through use of an idealized pressure versus volume (P-V) diagram 100 of a combustion cycle is shown. Thermodynamic assumptions for an ideal cycle include adiabatic processes for both compression and expansion, constant pressure combustion, and scavenging at constant volume.

The shaded section of the chart represents the theoretical difference between an engine running with an exhaust port valve in a low position (the piston closes the port at V1*) versus running with the valve in the in the up position (the piston closes the port at V1). It should be noted that this is an idealized characterization that does not take into account differences in tuning or differences in scavenging between open and closed modes of operation.

Energy input during a combustion process and energy lost during scavenging can be calculated from temperatures and specific heats:

$$Qc = Cp(Tc-Tb)$$

$$Qs = Cv(Ta-Td) \quad \text{Equation 1}$$

Thermal efficiency can then be defined as:

$$n = \frac{Qc + Qs}{Qc} \quad \text{Equation 2}$$

Using the Ideal Gas Law (PV=nRT) and defining the ratio of specific heats as $$\lambda = Cp/Cv \quad \text{Equation 3}$$

this can be written as $$n = 1 + \frac{1}{\lambda} \frac{PaVa - PdVd}{PcVc - PbVb} \quad \text{Equation 4}$$

An increase in thermal efficiency with the engine running with the exhaust valve in the down position as opposed to the up position can be defined as:

$$\Delta \eta = \frac{(P\dot{a}V\dot{a} - P\dot{d}V\dot{d}) - (PaVa - PdVd)}{\lambda(PaVa - PbVb)} \quad \text{Equation 5}$$

With increased compression and expansion ratios, more energy can be extracted from combustion and higher overall thermal efficiency can be achieved. A lower exhaust port can restrict the engine at higher engine speeds and can decrease the peak amount of power the engine can produce. When an engine such as this one is used in an aerial vehicle, lack of peak power can be noticed during takeoff and sprint conditions, especially when payload capacity is reached.

Figure 8:
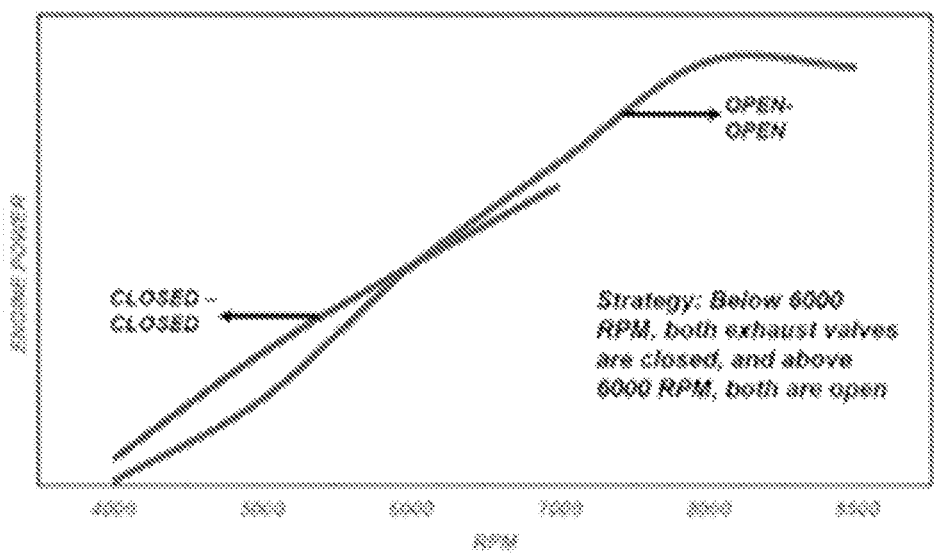
FIG. 8 is a chart of engine power.

At wide-open throttle, the engine should produce more power in the lower portion of the speed range with both the bypass valve of the cylinder and the bypass valve of the exhaust with the valves shut. The engine should also produce more power in the higher portion of the speed range with both the bypass valve of the cylinder and the bypass valve of the exhaust with the valves open. FIG. 8 provides a chart 100 illustrating this.

Up to approximately 6,000 revolutions per minute (rpm), valves in the closed position are shown as producing more shaft power. Above 6,000 rpm, valves in the open position are shown producing more power. Engine ports can be tuned to produce more overall peak power and variable exhaust mechanisms can be used to improve low speed torque, mitigating compromise between high and low speed power outputs. This can improve operation in conditions involving wind gusts, takeoff, and climbing over obstacles, among others.

Figure 9:
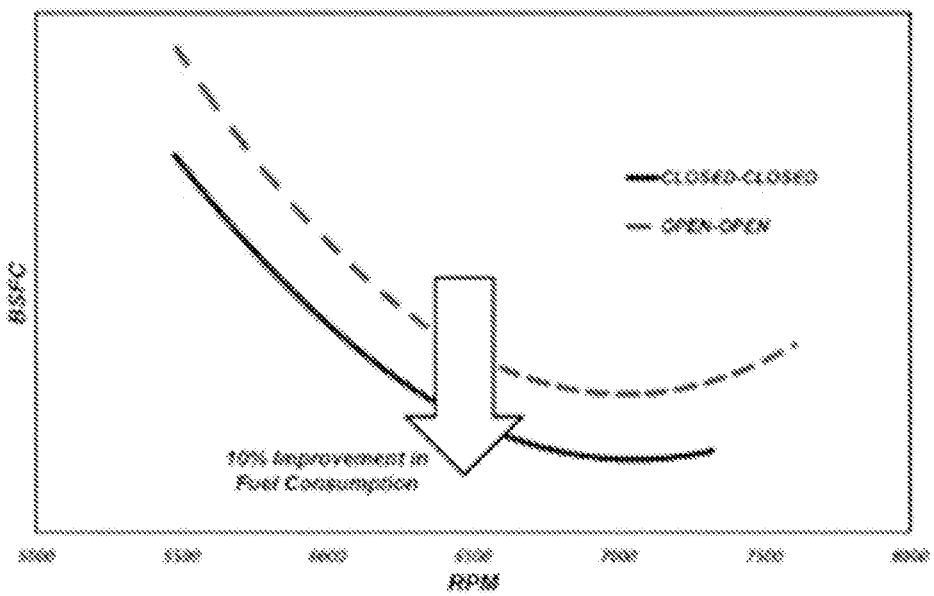
FIG. 9 is a graph of engine power and fuel flow.

The engine should run more efficiently with the exhaust bypass valve in the closed position. FIG. 9 provides a graph 100 created by test data gathered by running an engine on a propeller stand across its full speed range. Several distinct mini-map points were recorded along the propeller curve. The propeller was then removed and the engine placed on a dynamometer. Each mini-map point was recreated under controlled fuel-air ration conditions. Power and fuel flow were measured. Fuel flow was recorded using a temperature compensated, positive displacement flow measuring instrument that is accurate under low-flow conditions. Power was calculated from engine RPM and load cell-based torque measurements.

Output is Brake Specific Fuel Consumption (BSFC) as a function of engine speed. Along each efficiency curve, engine load varies at each RPM as required to spin the propeller. This measure of fuel consumption is normalized by engine power so engines of different displacement and type can be compared. With a 16-14 propeller, a 10% improvement in fuel consumption reduces fuel flow by approximately one gram per minute (1g/min).

Figure 5:
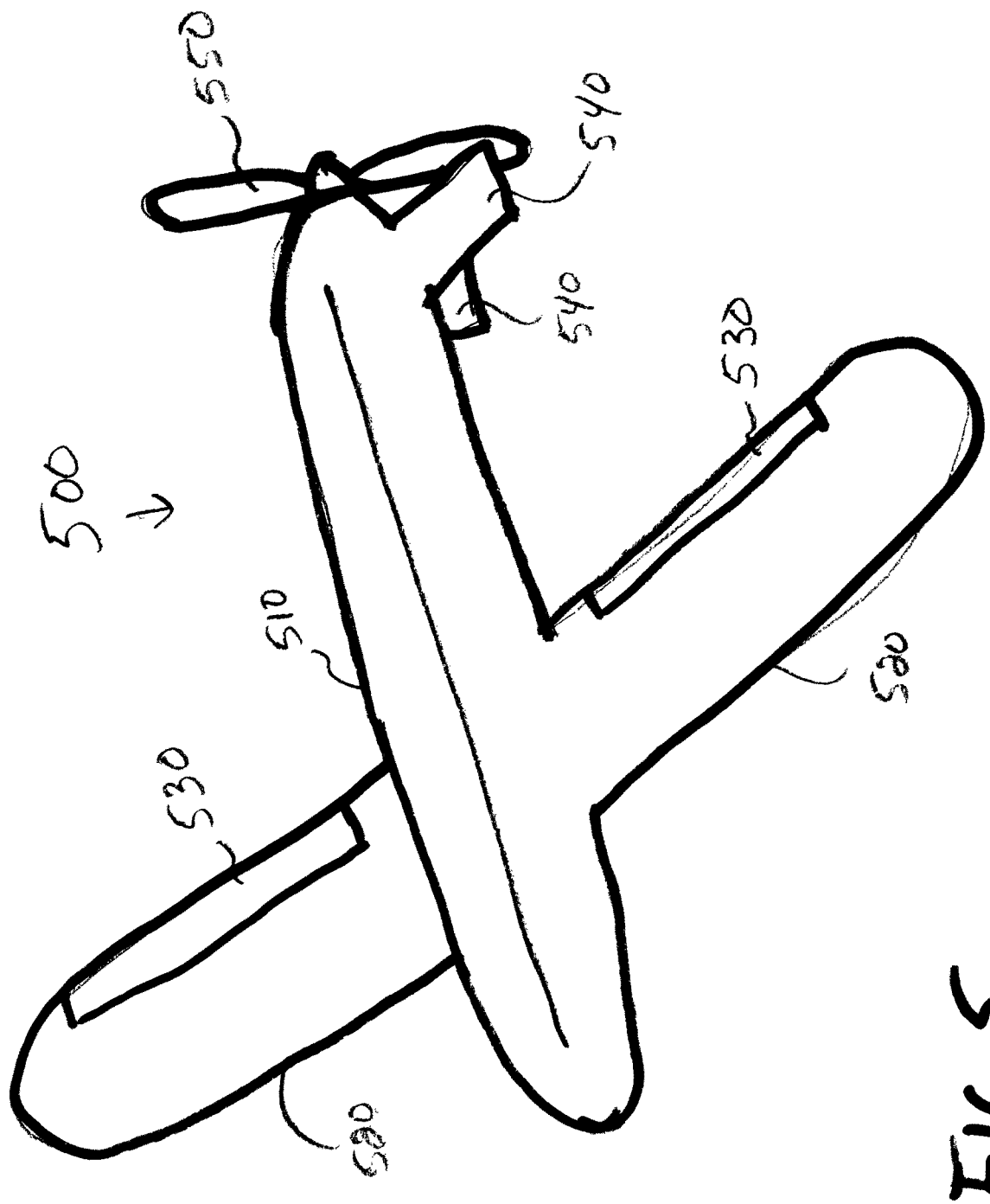
FIG. 5 is a perspective view of an unmanned aerial vehicle.

FIG. 5 is a perspective view of an unmanned aerial vehicle (UAV) 500. For case of discussion, a simplified diagram and discussion is provided. Those of ordinary skill in this art area will readily recognize from reading this disclosure that other components either can or must be present, depending upon the component and a particular implementation.

The UAV 500 can include a fuselage 510 with an airframe that has wings 520 affixed. Each of the wings 530 can include a control surface 530. Stabilizers 540 can be affixed at the rear of the fuselage 510. A propeller 550 can be used to provide forward thrust for the UAV 500. The propeller 550 can be driven by the engine 100 shown and described in conjunction with earlier figures.

This written description sets for the best mode of carrying out the invention, and describes the invention so as to enable a person skilled in the art to make and use the invention, by presenting examples of elements recited in the claims. The patentable scope of the invention is defined by the claims, and may include other examples that occur to those skilled in the art. Such other examples, which may be available either before or after the application filing date, are intended to be within the scope of the claims if they have elements that do not differ from the literal language of the claims, or if they have equivalent elements with insubstantial differences from the literal language of the claims.

What is claimed is:

1. An apparatus for adjusting power and noise characteristics of an internal combustion engine, comprising:
    a wall configured to define an engine cylinder that includes a bore and further configured to define a compression relief passage that extends from a combustion chamber of the engine cylinder to an exhaust passage that is in fluid communication with the cylinder;
    a compression relief valve configured to selectively adjust fluid flow capacity of the compression relief passage;
    a piston configured to travel in the cylinder bore and further configured to compress a mixture that includes a fuel and oxygen;
    an ignition source configured to initiate combustion of the mixture; and
    a manifold configured to be in fluid communication with the exhaust passage, including
        an exhaust bypass valve configured to permit an exhaust product resulting from ignition of the mixture to at least partially bypass a noise suppressor,
        a noise suppression passage configured to accept the exhaust product from the exhaust passage and route at least part of the exhaust product to a noise suppressor when the exhaust bypass valve is at least partially closed; and
        an exhaust vent configured to permit at least part of the exhaust product to bypass the noise suppressor when the exhaust bypass valve is at least partially open;
    wherein operational characteristics of the engine can be adjusted along a range that extends from a first set of operational characteristics present when both the compression relief valve and the exhaust bypass valve are in a fully open position to a second set of operational characteristics present when both the compression relief valve and the exhaust bypass valve are in a fully closed position.

2. The apparatus of claim 1, further comprising an electromechanical actuator configured to operate the compression relief valve.

3. The apparatus of claim 2, wherein the compression relief valve is configured to be operated by selectively changing pressure of a fluid.

4. The apparatus of claim 3, further comprising an electromechanical actuator configured to operate the exhaust bypass valve.

5. An engine comprising the apparatus of claim 1.

6. An aerial vehicle comprising the engine of claim 5.

7. A method for operating a combustion engine, comprising:
    actuating a compression relief valve to at least partially open a compression relief passage of an engine cylinder and permitting fluid in at least a portion of the engine cylinder to exit the engine cylinder through the compression relief passage; and
    actuating an exhaust bypass valve to at least partially open an exhaust bypass passage and permit an exhaust product to exiting the engine and bypass a noise suppressor;
    wherein a change in a position of at least one of the compression relief valve and the exhaust bypass valve changes at least one operational characteristic in a set of operational characteristics of the along a range that extends from a first set of operational characteristics that are present when both the compression relief valve and the exhaust bypass valve are in a fully open position to a second set of operational characteristics that are present when both the compression relief valve and the exhaust bypass valve are in a fully closed position.

8. The method of claim 7, further comprising using the compression relief valve to ease starting of the engine.

\* \* \* \* \*